(12) United States Patent
Phillips et al.

(10) Patent No.: US 9,773,072 B2
(45) Date of Patent: Sep. 26, 2017

(54) SYSTEMS AND METHODS FOR DEVELOPING ADAPTIVE LAYOUTS FOR ELECTRONIC CONTENT

(75) Inventors: Matt J. Phillips, Champaign, IL (US); Shawn Conrad Sheridan, Bellevue, WA (US); Paul Hanlin Sorrick, Seattle, WA (US); David Charles Stephens, Shoreline, WA (US)

(73) Assignee: Adobe Systems Incorporated, San Jose, CA (US)

( * ) Notice: Subject to any disclaimer, the term of this patent is extended or adjusted under 35 U.S.C. 154(b) by 765 days.

(21) Appl. No.: 13/487,393

(22) Filed: Jun. 4, 2012

(65) Prior Publication Data
US 2013/0326343 A1 Dec. 5, 2013

(51) Int. Cl.
*G06F 17/00* (2006.01)
*G06F 17/30* (2006.01)
*G06F 17/21* (2006.01)

(52) U.S. Cl.
CPC ...... *G06F 17/30905* (2013.01); *G06F 17/211* (2013.01)

(58) Field of Classification Search
CPC .......................... G06F 17/5081; G06F 17/505
USPC ....... 715/204, 211, 252, 238, 240, 243, 248, 715/249
See application file for complete search history.

(56) References Cited

U.S. PATENT DOCUMENTS

| 6,456,305 | B1 * | 9/2002 | Qureshi et al. | 715/800 |
|---|---|---|---|---|
| 7,568,154 | B2 * | 7/2009 | Salesin et al. | 715/243 |
| 8,751,924 | B2 * | 6/2014 | Carper | G06F 17/245 715/234 |
| 2004/0239691 | A1 * | 12/2004 | Sprang et al. | 345/651 |
| 2011/0074710 | A1 * | 3/2011 | Weeldreyer | G06F 3/0481 345/173 |

OTHER PUBLICATIONS

IEBlog IE10 Platform Preview and CSS Feature for Adaptive Layouts https://web.archive.org/web/20110417085042/http://blogs.msdn.com/b/ie/archive/2011/04/14/ie10-platform-preview-and-css-features-for-adaptive-layouts.aspx.*
Golden Grid System Four Features https://web.archive.org/web/20111003083354/http://goldengridsystem.com/.*
Mogilevsky et al., CSS Grid Layout, Published Mar. 22, 2012, W3C, Working Draft, pp. 1-38 (pdf).*
Atkins Jr. et al., CSS Flexible Box Layout Module, Published Mar. 22, 2012, W3C, Working Draft, pp. 1-39 (pdf).*

* cited by examiner

*Primary Examiner* — Manglesh M Patel
(74) *Attorney, Agent, or Firm* — Kilpatrick Townsend & Stockton LLP

(57) ABSTRACT

One embodiment involves placing a guide on a layout for a page of electronic content including a first object and a second object. The guide contacts the first object and does not contact the second object. The electronic content can be encoded based on the guide contacting the first object and not contacting the second object. The encoded electronic content, when interpreted or executed, can respond to a page size change by resizing a size of the first object on the page and translating a position of the second object on the page. Another exemplary embodiment involves modifying a page including a first object and a second object. The first object can be resized or translated based on an object policy. The second object can be resized or translated based on the modified page size and differently from the resizing or translating of the first object.

23 Claims, 7 Drawing Sheets

SYSTEMS AND METHODS FOR DEVELOPING ADAPTIVE LAYOUTS FOR ELECTRONIC CONTENT

TECHNICAL FIELD

This disclosure relates generally to computer-implemented methods and systems and more particularly relates to the development of adaptive layouts for paginated content to be rendered for display on computing devices.

BACKGROUND

The term "electronic content" refers to any type of media that can be displayed on mobile and other computing devices. Computing devices include devices such as desktop computers, laptop computers, smart phones, tablet computers, personal digital assistants, etc. Electronic content can include text or multimedia hosted on websites, such as standard web pages or mobile web pages specifically formatted for display on computing devices. Electronic content can also include application software developed for computing devices that is designed to perform one or more specific tasks at the computing device.

Publishers and designers can develop applications and other electronic content that includes highly designed, paginated publications such as books and magazines. Developing paginated electronic content to be rendered for display on computing devices with different display screen sizes, such as different tablet computers or smart phones, can involve developing layouts for different display screen sizes, different display screen resolutions, and different orientations for a single computing device based on how a user holds the device. Some computing devices can render electronic content differently based on the orientation of the device. Non-limiting examples of such computing devices can include tablet computers and mobile phones including a mobile computing platform, such as smart phones. A design for an application or other paginated electronic content may also be rendered for display differently based on different paper sizes associated with a document or application, such as a U.S. Letter or A4 (ISO 216) paper size.

Previous solutions for developing applications and other electronic content do not adequately provide for designing for many screen sizes at the same time. Previous solutions can require labor-intensive processes to manually adapt a design for an application or other electronic content to different computing devices. Such solutions do not allow for developing electronic content that can be adapted to different devices having different display characteristics.

SUMMARY

One embodiment involves a development application executed by a processor placing a guide on a layout for a page of electronic content. The page includes a first object and a second object. The guide contacts the first object. The exemplary embodiment further involves the development application encoding the electronic content based at least in part on the guide contacting the first object. The encoded electronic content, when interpreted or executed by a viewer application, responds to a page size change by providing a new layout for the page. The new layout for the page is provided by resizing the first object on the page.

Another exemplary embodiment involves a viewer application executed by a processor modifying a size of a page. The page includes a first object and a second object. The first object is associated with an object policy specifying at least one of a resizing behavior or a translation behavior for the first object. The exemplary embodiment further involves the viewer application resizing or translating the first object based on the object policy. The exemplary embodiment further involves the viewer application resizing or translating the second object based on the size of the page as modified. The resizing or translating of the first object is different from the resizing or translating of the second object.

Another exemplary embodiment involves a development application executed by a processor placing a guide on a layout for a page of electronic content. The page includes a first object and a second object. The guide contacts the first object and the second object. The second object is associated with an object policy. The object policy specifies a resizing behavior for the second object. The exemplary embodiment further involves the development application encoding the electronic content based at least in part on the guide contacting the first object and the second object being associated with the object policy. The encoded electronic content, when interpreted or executed by a viewer application, responds to a page size change by providing a new layout for the page. The new layout for the page is provided by resizing the first object on the page based on the first object contacting the guide and by resizing the second object based on the object policy. The resizing of the first object is different from the resizing of the second object.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
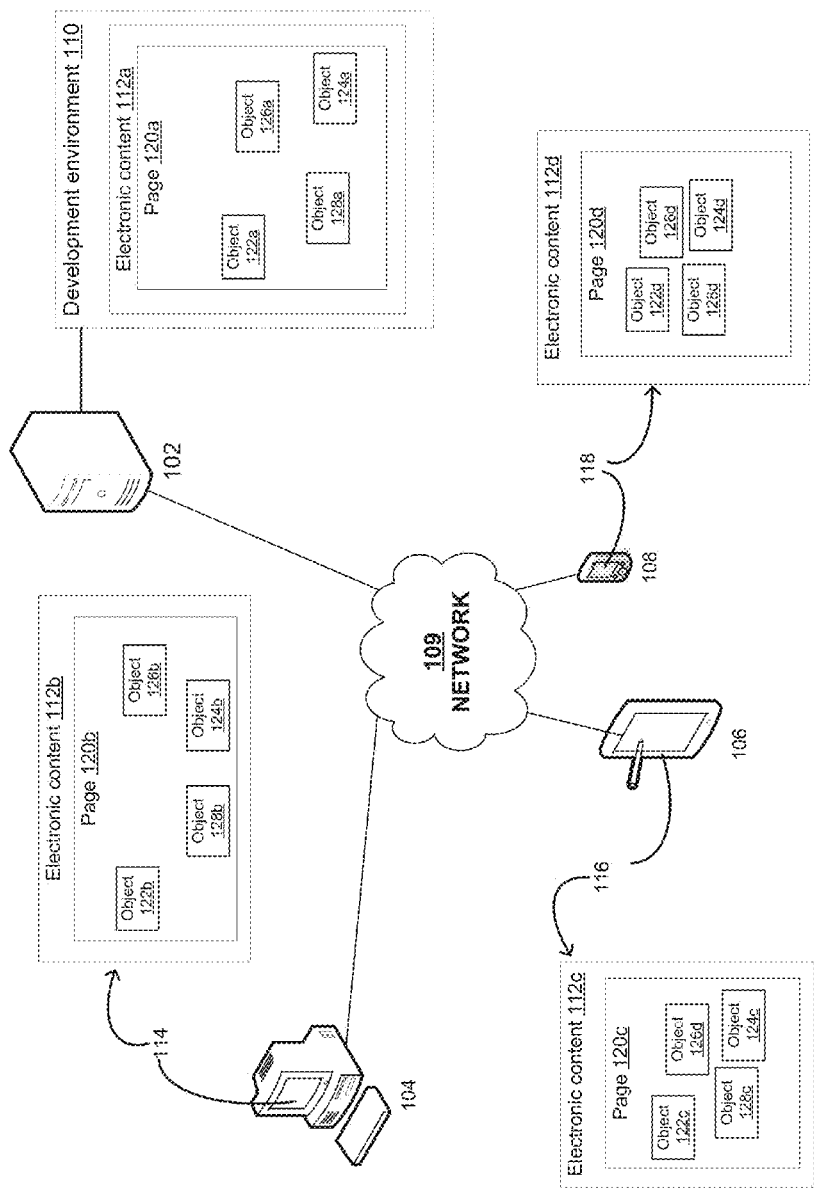
FIG. 1 is a network diagram illustrating a development system in communication with multiple computing devices via a network.

Computer-implemented systems and methods are disclosed for developing adaptive layouts for paginated content to be rendered for display on computing devices. A layout can be dynamically generated such that paginated content can be rendered for display as a page on a variety of computing devices. For example, electronic content may be a document being developed for use on a laptop computer, a tablet computer, and a smart phone. A layout policy can specify one or more rules for changing the size of objects or the position of objects on a page of the document based on differences among the various devices in screen size, screen resolution, page orientation, and the like.

As used herein, the term "layout" can refer to one or more instructions controlling how one or more items of electronic content are rendered for display. A layout can include instructions specifying how each of the one or more content items is positioned when rendered for display. A layout can also include instructions specifying a size for each of the one or more content items when rendered for display.

In an exemplary embodiment, a development application executed by a processor can develop an adaptive layout using a guide policy. A guide policy can include placing a guide on a page. The page includes a first object and a second object. The guide can control how objects on the page are resized or translated. Non-limiting examples of a guide can include a line extending through the page, a selection box, or any other visual indicator distinguishing one or more objects being resized or translated based on the guide from one or more other objects not being resized or translated based on the guide. The guide can contact the first object and not contact the second object. The development application can modify a size of the page. The development application can resize the first object based on the guide contacting the first object. The development application can translate a position of the second object based on the guide not contacting the second object.

The development application can, but need not, be included in a development environment. As used herein, the term "development environment" refers to a cross-platform runtime environment for different computing devices to create and modify electronic content being developed. Non-limiting examples of a cross-platform runtime environment can include Adobe Integrated Runtime (Adobe® AIR®), Adobe® Flash® Builder® and Adobe® InDesign CS6®. A development environment can also include one or more software modules for providing and receiving input specifying modifications to the electronic content. The development environment can be executed at one or more development computing devices. A development computing device can modify some or all of the features of electronic content being developed. A development computing device can be, but is not limited to, a desktop computer, a laptop computer, a server systems, etc.

As used herein, the term "page" refers to a portion of electronic content to be rendered for display on a display screen of a computing device. The page can include one or more objects of the electronic content arranged in such a manner as to be simultaneously rendered for display on a display screen. A first page of the electronic content rendered for display at a first computing device having a first set of rendering attributes can be different from a second page of the electronic content rendered for display at a second computing device having a second set of rendering attributes. For example, the first page of a chapter of an electronic book rendered for display at a tablet computer may include more of the electronic content than the first page of the same chapter of the electronic book rendered for display at a smart phone.

As used herein, the term "rendering attribute" refers to a characteristic of a computing device controlling how electronic content is rendered for display at the computing device. Non-limiting examples of rendering attributes can include the dimensions of the screen where the electronic content being developed is displayed, the shape of the display screen, the resolution of the display screen, and the like.

As used herein, the term "object" refers to a content item included in electronic content, such as text, images, videos, functions, or any combination of text, images, videos, etc. An object can include other objects nested within the object. For example, an object that is a header section for a page of electronic content can include a text object and an image object nested within the header object.

As used herein, the term "resizing" refers to performing one or more linear transformations upon an object that modifies the size of the object. A non-limiting example of resizing an object can include scaling an object.

As used herein, the term "translating" refers to changing a position of an object on a page of electronic content. A translation can include movement moving every point in the object by the same distance and in the same direction. A translation can be performed without rotating, reflecting, or changing the size of the object.

Electronic content can be rendered for display differently at different computing devices. The displayed differences may be a result, for example, of differences in rendering attributes of each of the computing devices. Displaying the electronic content differently can include rendering the electronic content using different page orientations on different devices.

A guide policy including one or more guides for a page of electronic content can control how objects are resized in response to rendering the objects for display at different computing devices. For example, electronic content can include a first object, such as a picture, and a second object, such as a text block. The electronic content can be arranged on a page that is developed using a layout. The layout can include one or more guides. A guide can be, for example, a line extending from the top of the page to the bottom of the page. The guide can intersect the picture and not the text block. If the page of electronic content is resized by a viewer application, such as a browser application executed at mobile phone, objects intersected by the guide can be resized and objects not intersected by the guide can move. Thus, if the width of the page changes, the width of the picture that is intersected by the guide can change and the size of the text block not intersected by the guide can remain unchanged.

A guide can be a line or other visual indicator placed on a page of electronic content being developed. An object in contact with a guide can be resized based on contacting the guide. Resizing an object in contact with the guide can include modifying the height or width of the object based on the respective height or width of the page as modified. For example, a page of electronic content can include multiple objects such as a footer across the bottom of the page, a header across the top of the page, a sidebar at one edge of the page, text in the middle of the page, a picture in the corner of the page, etc. The size of one or more objects in contact with the guide can be modified in response to the page changing in size. In one embodiment, the guide can be a horizontal line providing a vertical guide. Resizing an object in contact with the vertical guide can include modifying a height of the object based on the height of the page as modified. A non-limiting example of modifying a height of the object based on the height of the page as modified is modifying the height of the object in proportion to the height of the page as modified. Thus, for a vertical guide contacting only the sidebar at one edge of the page and the text in the middle of the page, increasing the height of the page can modify the height of the sidebar and the text and leave the height of other objects on the page unchanged. In another embodiment, the guide can be a vertical line providing a horizontal guide. Resizing an object in contact with the horizontal guide can include modifying a width of the object based on the width of the page as modified. A non-limiting example of modifying a width of the object based on the width of the page as modified is modifying the width of the object in proportion to the width of the page as modified. Thus, for a horizontal guide contacting only the header and footer of the page and the text in the middle of the page, increasing the width of the page can modify the width of the header, footer, and the text and leave the width of other objects on the page unchanged.

A guide policy can also control how objects are translated by determining where space between objects on the page can be added to or removed from the page. For example, modifying the size of the page can include changing the height of the page in response to input in a vertical direction, such as dragging the top edge of the page upward. A first object can be located between a vertical guide and the top edge of the page. Translating the first object can include modifying the position of the second object in the vertical direction, such as moving the first object upward. A second object can be located between a vertical guide and the bottom edge of the page. The second object can remain stationary in response to the input dragging the top edge of the page upward.

In additional or alternative embodiments, an object policy can be applied to one or more objects on a page. An object policy can include instructions specifying how one or more specific objects can be resized or translated in response to a change in the size of the page. An object policy can specify that the position of an object is determined by a distance from an edge of the object to an edge of the page. Such a distance can be fixed or variable. An object policy can alternatively or additionally specify that the height or width of the object can be determined based on the page or can be a fixed size regardless of the size of the page. An object policy can be applied in combination with a guide policy. The object policy can include an instruction that at least one of the resizing or translation of an object associated with the object policy is controlled by the object policy rather than any guide policies applied to the page.

In additional or alternative embodiments, a page transform policy can be applied to a page of electronic content. A page transform policy can specify that modifying the size of a page of electronic content can cause the size of objects on the page to be modified based on the change in the size of the page. A page transform policy can be applied in combination with a guide policy, in combination with an object policy, or in combination with both a guide policy and an object policy.

In additional or alternative embodiments, electronic content can be associated with an alternative layout policy. An alternative layout policy can include associating electronic content such as a document with multiple layouts. Each of the layouts can be associated with a respective layout policy. For example, a first layout policy can be used for a tablet computing device using a portrait orientation. A second layout policy can be used for the tablet computing device using a landscape orientation. A third layout policy can be used for a smart phone having a reduced amount of space for display objects as compared to a tablet computing device. Each of the layouts can include one or more guide policies, one or more object polices, a page transform policy, or a combination of policies. The alternative layout policy can link objects among different layouts by specifying one or more objects that are common to a page to be shared among different layouts. Specifying one or more objects to be shared among different layouts can allow for changing objects in a first layout and propagating the change to associated layouts for the alternative layout policy.

In additional or alternative embodiments, a hybrid resize and adapt algorithm can be applied for layouts having one or more guides in only one of the vertical or horizontal directions. For a page having a horizontal guide, the page can be resized such that the page can increase in height until the top and the bottom edges of the display screen are encountered. The horizontal guide can determine how to change the width of the page such that page can fit the display screen size. For example, a page can include a sidebar object that occupying a certain amount of space on the right hand side of the display screen. For display screens of different heights and widths, the page can be resized to the respective height or width of the tablet.

In additional or alternative embodiments, a development environment can nest layout policies. Nesting layout policies can include defining one or more layout policies for a group of objects. A layout policy can be applied to an object or to a group of objects on a page that is different from the layout policy applied to the page as a whole. For example, a page transform policy can be associated with a group of objects on a page that is associated with a guide policy. The nesting of layout polices can be arbitrarily deep.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Referring now to the drawings, FIG. 1 is a network diagram illustrating a development system 102 in communication with multiple computing devices via a network 109.

The development system 102 can be any suitable computing system for hosting the development environment 110. In one embodiment, the development system 102 may be a single computing system. In another embodiment, the development system 102 may be a virtual server implemented using a number of computing systems connected in a grid or cloud computing topology. The development system 102 can include any suitable operating system, such as (but not limited to) Microsoft® Windows® or OS X.

The development environment 110 can include one or more software modules for developing electronic content 112a. For example, a development environment 110 can include software modules for editing source code of electronic content 112a being developed, for compiling the source code of electronic content 112a into object code used by a computing device, and for debugging electronic content 112a. A development application included in the development environment 110 can also be used to develop electronic content 112a for multiple types of computing devices and multiple operating systems. Non-limiting examples of a development environment 110 can include Adobe® Flash® Builder® and Adobe® InDesign C56®.

In one embodiment, the development environment 110 can apply a layout policy to each page of the electronic content 112a individually. In another embodiment, the development environment 110 can apply a layout policy to a master page that is a customizable template which captures design attributes or elements that are common to a class of pages. Pages of the electronic content 112a within a class of pages can inherit the layout policy from the master page.

The development environment 110 can encode the electronic content 112a for storage and transmission to one or more of the computing devices. Non-limiting examples of encoding formats can include electronic publication ("EPUB"), portable document formats ("PDF"), HyperText Markup Language ("HTML") formats, and proprietary formats such as Adobe® Folio®.

In one embodiment, the development environment 110 can encode a layout policy via page-level and object level metadata. Encoding a layout policy via page-level and object level metadata can be used for electronic content provided to a viewer application that can determine the layout policy from the metadata of the electronic content. In another embodiment, the development environment 110 can encode a layout policy using the functions of the electronic content. Non-limiting examples of such functions can include equations, percentages, and selective coordinate declarations specifying the right and width coordinates to right justify an object on a page, and media-query type encodings. Encoding the layout policy using the functions of the electronic content can be used for electronic content provided to a viewer application that can apply the layout policy based on a document object model.

In another embodiment, the development environment 110 can encode a layout policy via one or more scripts in a viewer-supported language executable when the electronic content is rendered for display. An example of such a scripting language includes Javascript. The one or more scripts can calculate a size and/or a position for one or more objects on a page of electronic content. Encoding the layout policy via a scripting language can be used for electronic content provided to a viewer application that does not explicitly support a layout policy but can execute the one or more scripts.

The computing devices can include a desktop computer 104, a tablet computer 106, and a smart phone 108. The desktop computer 104, the tablet computer 106, and the smart phone 108 can access, via the network 109, electronic content developed in a development environment 110.

Each of the computing devices can include a viewer application configured to render the electronic content for display at the respective device. In one embodiment, a viewer application can interpret a layout policy for electronic contents that is included in metadata embedded in the electronic content by the development environment 110. The viewer application can render the electronic content for display using the layout policy interpreted from the metadata. In another embodiment, a viewer application having generic mechanisms for representing a layout can read instructions for implementing the layout policy from the electronic content. The viewer application can apply the instructions to render the electronic content for display. In another embodiment, a viewer application having scripting capabilities can execute one or more scripts embedded in the electronic content by the development environment 110. Executing the one or more scripts can adjust the layout of the electronic content based on the display characteristics of the computing device.

While three computing devices are depicted in FIG. 1, any number of computing devices can access electronic content developed using the development environment 110. The types of computing devices that can access a development environment is not limited to those depicted in FIG. 1, but rather can be any type of computing device capable of using electronic content. In some embodiments, the electronic content 112a can be accessed from a development system 102 that is a server. In other embodiments, the development system 102 can provide the electronic content 112a to a server or other computing system from which other computing devices can access the electronic content 112a.

FIG. 1 also illustrates how electronic content 112a being developed is displayed differently on different computing devices. The electronic content 112a can include the objects 122a, 124a, 126a, and 128a arranged on a page 120a. The electronic content can be rendered for display differently at each of the computing devices. For example, a display screen 114 of the desktop computer 104 can display electronic content 112b that is a local copy of the electronic content 112a rendered for display using a landscape orientation. The electronic content 112b can include the objects 122b, 124b, 126b, and 128b arranged on a page 120b. A display screen 116 of the tablet computer 106 can display electronic content 112c that is a local copy of the electronic content 112a using a portrait orientation. The electronic content 112c can include the objects 122c, 124c, 126c, and 128c arranged on a page 120c. The display screen 118 of smart phone 108 can display electronic content 112d that is a local copy of the electronic content 112a rendered for display using a portrait orientation. The electronic content 112d can include the objects 122d, 124d, 126d, and 128d arranged on a page 120d.

The electronic content 112b, 112c, 112d respectively depicted at the displays 114, 116, and 118 can include different resizing factors and positions for the respective objects arranged on the pages 120b, 120c, 120d. The development environment 110 can be used to develop policies controlling the resizing factors and positions for the respective objects.

Figure 2:
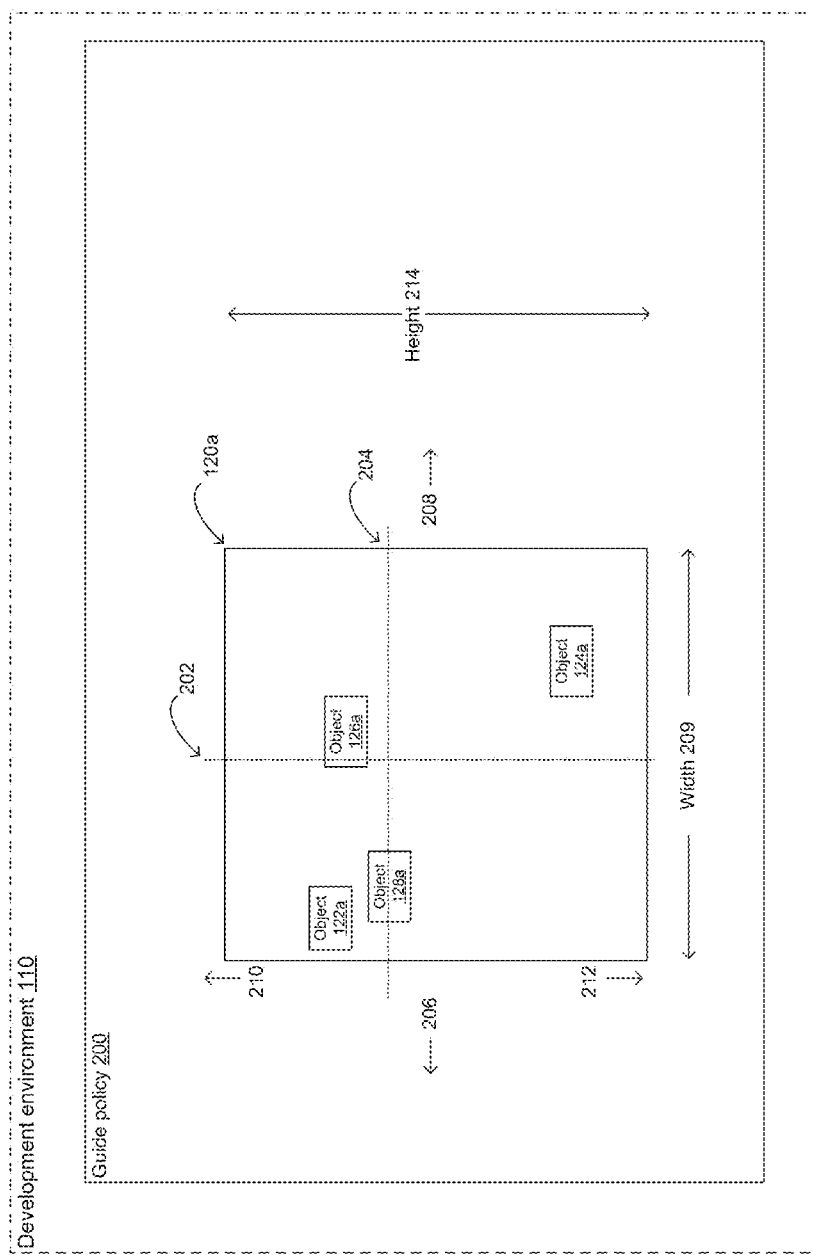
FIG. 2 is a conceptual diagram illustrating the application of a guide policy to a page of electronic content.

FIG. 2 is a conceptual diagram illustrating the application of a guide policy 200 to a page 120a of electronic content 112a. A guide policy 200 can configure a viewer application to resize objects included in a page 120a. A guide policy 200 can configure a viewer application to translate objects by, for example, inserting or removing space in a layout based on a size of the page 120a being modified.

A guide policy 200 can allow a layout for a page 120a to adapt to different page sizes associated with different computing devices using a small number of guides. For example, a single guide can be used to determine a translation behavior and/or resizing behavior of one or more objects in response to a page being resized. The guide can thereby obviate the need to specify a translation behavior and/or resizing behavior on an individual basis for each object on the page.

The guide policy 200 depicted in FIG. 2 includes a horizontal guide 202 and a vertical guide 204. The horizontal guide 202 can control changes in the width or horizontal position of objects 122a, 124a, 126a, 128a in response to one or more of horizontal commands 206, 208 indicating a change in the width 209 of the page 120a. The vertical guide 204 can control changes in the size or position of objects 122a, 124a, 126a, 128a in response to one or more of vertical commands 210, 212 indicating a change in the height 214 of the page 120a.

One or more of the horizontal commands 206, 208 can cause a change in width 209 to the page 120a. The horizontal commands 206, 208 can be generated by any suitable method, such as (but not limited to) a mouse-click dragging an edge of the page 120a or by the detection of or otherwise indicating a change in a display screen size. FIG. 2 depicts the horizontal command 206 as moving the left-hand edge of the page 120a leftward and the horizontal command 208 as moving the right-hand edge of the page 120a rightward, thereby increasing the width 209. The horizontal command 206 can also indicate that the left-hand edge of the page 120a is to be moved rightward, thereby decreasing the width 209. The horizontal command 208 can also indicate that the right-hand edge of the page 120a is to be moved leftward, thereby decreasing the width 209. The horizontal commands 206, 208 can be applied individually or in combination.

A change in the width of the page 120a in response to the horizontal command 206 can cause a change in the width of the object 126a and the horizontal positions of the objects 122a, 128a.

The width of the object 126a, which is intersected by or otherwise in contact with the horizontal guide 202, can change based on a change to the width of the object 128a. In one embodiment, the object 126a can be a text object. The text of the object 126a can be reflowed to fit the width of the object 126a as modified. For example, an increase in the width of a text object can cause text rendered for display on two lines to be rendered for display on a single line and a decrease in the width of a text object can cause text rendered for display on a single to be rendered for display on two lines. In another embodiment, the object 126a can be an image object. A change to the width of the image object 126a configured to have a constant aspect ratio can cause the height of the image object 126a to change in accordance with the aspect ratio.

In one embodiment, a position of the object 126a intersected by or otherwise in contact with the horizontal guide 202 can remain unchanged in response to the horizontal command 206. In another embodiment, of the object 126a intersected by or otherwise in contact with the horizontal guide 202 can change in response to a change in the width of the object 126a. A layout for page 120a can specify that the center of the object 126a is positioned at a center of the page. A change in the width of the object 126a can cause a change in position of the object 126a such that the object 126a remains centered on the page and in contact with the horizontal guide 202. A layout for page 120a can also specify that the left edge of the object 126a is to be located at a constant position relative to the left side of the page 120a and that the right edge of the object 126a is to be located at a constant position relative to the right side of the page 120a.

The horizontal positions of the objects 122a, 128a can be translated in the direction of the horizontal command 206. The respective widths of the objects 122a, 128a can remain unchanged.

The object 124a does not contact the horizontal guide 202. The width of the object 124a is thus unchanged in response to the horizontal command 206. The object 124a is positioned opposite the objects 122a, 128a with respect to the horizontal guide 202. The position of the object 124a is thus unchanged in response to the horizontal command 206.

A change in the width of the page 120a in response to the horizontal command 208 can cause a change in the width of the object 126a and the horizontal positions of the object 124a. The width of the object 126a intersected by or otherwise in contact with the horizontal guide 202 can increase. The position of the object 126a intersected by or otherwise in contact with the horizontal guide 202 can remain unchanged. The horizontal position of the object 124a can be translated in the direction of the horizontal command 208. The width of the object 124a can remain unchanged. The width of the objects 122a, 128a can remain unchanged in response to the horizontal command 208. The objects 122a, 128a are positioned opposite the object 124a with respect to the horizontal guide 202. The respective positions of the objects 122a, 128a can thus remained unchanged in response to the horizontal command 208.

One or more of the vertical commands 210, 212 can indicate a change in the height 214 to the page 120a. The vertical commands 210, 212 can be generated by any suitable method, such as (but not limited to) a mouse-click dragging an edge of the page 120a or a command generated by the detection of or otherwise indicating a change in a display screen size. FIG. 2 depicts the vertical command 210 as moving the top edge of the page 120a upward and the vertical command 212 as moving the bottom edge of the page 120a downward, thereby increasing the height 214. The vertical command 210 can also indicate that the top edge of the page 120a is to be moved downward, thereby decreasing the height 214. The vertical command 212 can also indicate that the bottom edge of the page 120a is to be moved upward, thereby decreasing the height 214. The vertical commands 210, 212 can be applied individually or in combination.

A change in the height of the page 120a in response to the vertical command 210 can cause a change in the height of the object 128a and the vertical positions of the objects 122a, 126a. The height of the object 128a intersected by or otherwise in contact with the vertical guide 204 can increase. The vertical positions of the objects 122a, 126a can be translated in the direction of the vertical command 210. The respective heights of the objects 122a, 126a can remain unchanged.

The object 124a does not contact the vertical guide 204. The height of the object 124a is thus unchanged in response to the vertical command 210. The object 124a is positioned opposite the objects 122a, 126a with respect to the vertical guide 204. The position of the object 124 is thus unchanged in response to the vertical command 210.

A change in the height of the page 120a in response to the vertical command 212 can cause a change in the height of the object 128a and the vertical positions of the object 124a. The height of the object 128a intersected by or otherwise in contact with the vertical guide 204 can increase. In one embodiment, the position of the object 128a intersected by or otherwise in contact with the vertical guide 204 can remain unchanged. In another embodiment, the position of the object 128a intersected by or otherwise in contact with the vertical guide 204 can change in response to a change in size of the object 128a.

The vertical position of the object 124a can be translated in the direction of the vertical command 212. The height of the object 124a can remain unchanged. The height of the objects 122a, 126a can remain unchanged in response to the vertical command 212. The objects 122a, 126a are positioned opposite the object 124a with respect to the vertical guide 204. The respective positions of the objects 122a, 126a can thus remained unchanged in response to the vertical command 212.

Although the page 120a is depicted with a single vertical guide and a single horizontal guide, additional or alternative embodiments can include the development environment 110 placing any number of horizontal and/or horizontal guides on the page. For a page having multiple vertical guides or horizontal guides, a resizing algorithm can be applied multiple times. In one embodiment, multiple changes in the size of an object associated with respective guides can be apportioned equally between the guides. In another embodiment, a "weight" parameter can be assigned to a guide to such that a first amount of change in the size of an object based on a first guide can be different from a second amount of change in the size of an object based on a second guide.

Figure 3:
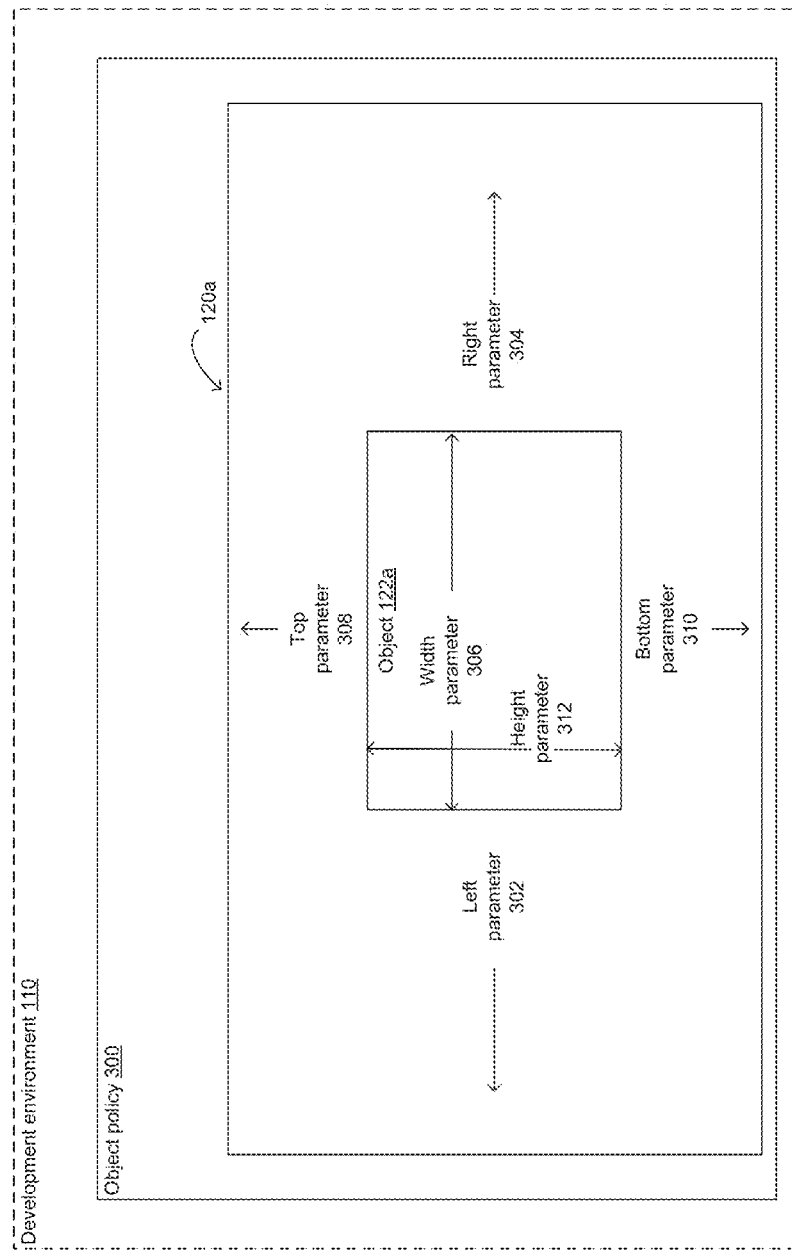
FIG. 3 is a conceptual diagram illustrating the application of an object policy to an object.

FIG. 3 is a conceptual diagram illustrating the application of an object policy 300 to the object 122a. An example object policy 300 can include horizontal adaptation parameters such as a left parameter 302, a right parameter 304, and a width parameter 306. The object policy 300 can also include vertical adaptation parameters such as a top parameter 308, a bottom parameter 310, and a height parameter 312. Each of the horizontal or vertical adaptation parameters can have a variable value or a fixed value.

The left parameter 302 can determine a relationship between the left edge of the object 122a and the left edge of the page 120a. A variable value of the left parameter 302 can allow the left edge of the object 122a to move in response to a change in the size of the page 120a. A fixed value of the left parameter 302 can prevent the left edge of the object 122a from moving in response to a change in the size of the page 120a.

The right parameter 304 can determine a relationship between the right edge of the object 122a and the right edge of the page 120a. A variable value of the right parameter 304 can allow the right edge of the object 122a to move in response to a change in the size of the page 120a. A fixed value of the right parameter 304 can prevent the right edge of the object 122a from moving in response to a change in the size of the page 120a.

The width parameter 306 can determine a relationship between the width of the object 122a and the width of the page 120a. A variable value of the width parameter 306 can allow the width of the object 122a to change in response to a change in the size of the page 120a. A fixed value of the width parameter 306 can prevent the width of the object 122a from changing in response to a change in the size of the page 120a.

At least one of the left parameter 302, the right parameter 304, and the width parameter 306 can have a variable value. A change in the width of the page 120a can cause a change in one or more of the left parameter 302, the right parameter 304, and the width parameter 306. In one embodiment, one of the horizontal adaptation parameters can have variable width. A change in the width of the page 120a can cause a corresponding change in the value of the horizontal adaptation parameter having a variable value. In another embodiment, two or more of the horizontal adaptation parameters can have variable value. A change in the width of the page 120a can cause a corresponding change in value to be apportioned to each of horizontal adaptation parameters having a variable value.

The top parameter 308 can determine a relationship between the top edge of the object 122a and the top edge of the page 120a. A variable value of the top parameter 308 can allow the top edge of the object 122a to move in response to a change in the size of the page 120a. A fixed value of the top parameter 308 can prevent the top edge of the object 122a from moving in response to a change in the size of the page 120a.

The bottom parameter 310 can determine a relationship between the bottom edge of the object 122a and the bottom edge of the page 120a. A variable value of the bottom parameter 310 can allow the bottom edge of the object 122a to move in response to a change in the size of the page 120a. A fixed value of the bottom parameter 310 can prevent the bottom edge of the object 122a from moving in response to a change in the size of the page 120a.

The height parameter 312 can determine a relationship between the height of the object 122a and the height of the page 120a. A variable value of the height parameter 312 can allow the height of the object 122a to change in response to a change in the size of the page 120a. A fixed value of the height parameter 312 can prevent the height of the object 122a from changing in response to a change in the size of the page 120a.

At least one of the top parameter 308, the bottom parameter 310, and the height parameter 312 can have a variable value. A change in the height of the page 120a can cause a change in one or more of the top parameter 308, the bottom parameter 310, and the height parameter 312. In one embodiment, one of the vertical adaptation parameters can have variable height. A change in the height of the page 120a can cause a corresponding change in the value of the vertical adaptation parameter having a variable value. In another embodiment, two or more of the vertical adaptation parameters can have variable value. A change in the height of the page 120a can cause a corresponding change in value to be apportioned to each of vertical adaptation parameters having a variable value. A non-limiting example of a corresponding change is a change in a horizontal or vertical parameter that is proportionate to a respective change in the height or width of the page.

In additional or alternative embodiments, a layout policy can include a combination of a guide policy 200 and/or an object policy 300 with a page transform policy. A page transform policy can include a resizing parameter, a vertical justification parameter, and a horizontal justification parameter. For example, a page transform can modify the size of the entire page and change the size of the objects on the page based on the change in the size of the page. A page transform policy can be used, for example, to render one or more objects of the electronic content that cannot be adapted, such as a full-page advertisement provided by a third party and included in an online magazine application.

A resizing parameter can have values such as, for example, "None," "Fit," and "Fill." A "None" value can correspond to no resizing being applied. A viewer application rendering a page of electronic content having a "None" value for the resizing parameter can render the page at the same size as the design size, regardless of whether the design size can fit a size of display screen. A "Fit" value can correspond to the page being resized uniformly so that it is as large as possible without clipping any of the content. A "Fit" value can cause a viewer application to include padding on the top edge, bottom edge, left edge, and/or right edge of the display screen. A "Fill" value can correspond to the page being resized uniformly such that the page fills a display screen. A "Fill" value can cause a viewer application to crop some of the electronic content being rendered for display.

A vertical justification parameter can control the rendering of a page of electronic content that does not match the height of a display screen. A vertical justification parameter can be used to align the page to the top, center, or bottom of a vertical axis along the page. The viewer application may include padding or clipping for a non-aligned edge of the page of electronic content.

A horizontal justification parameter can control the rendering of a page of electronic content that does not match the width of a display screen. A horizontal justification parameter can be used to align the page to the left, center, or right of a horizontal axis along the page. The viewer application may include padding or clipping for a non-aligned edge of the page of electronic content. Other design parameters such as a background image or color can be specified whenever padding is included.

Figure 4:
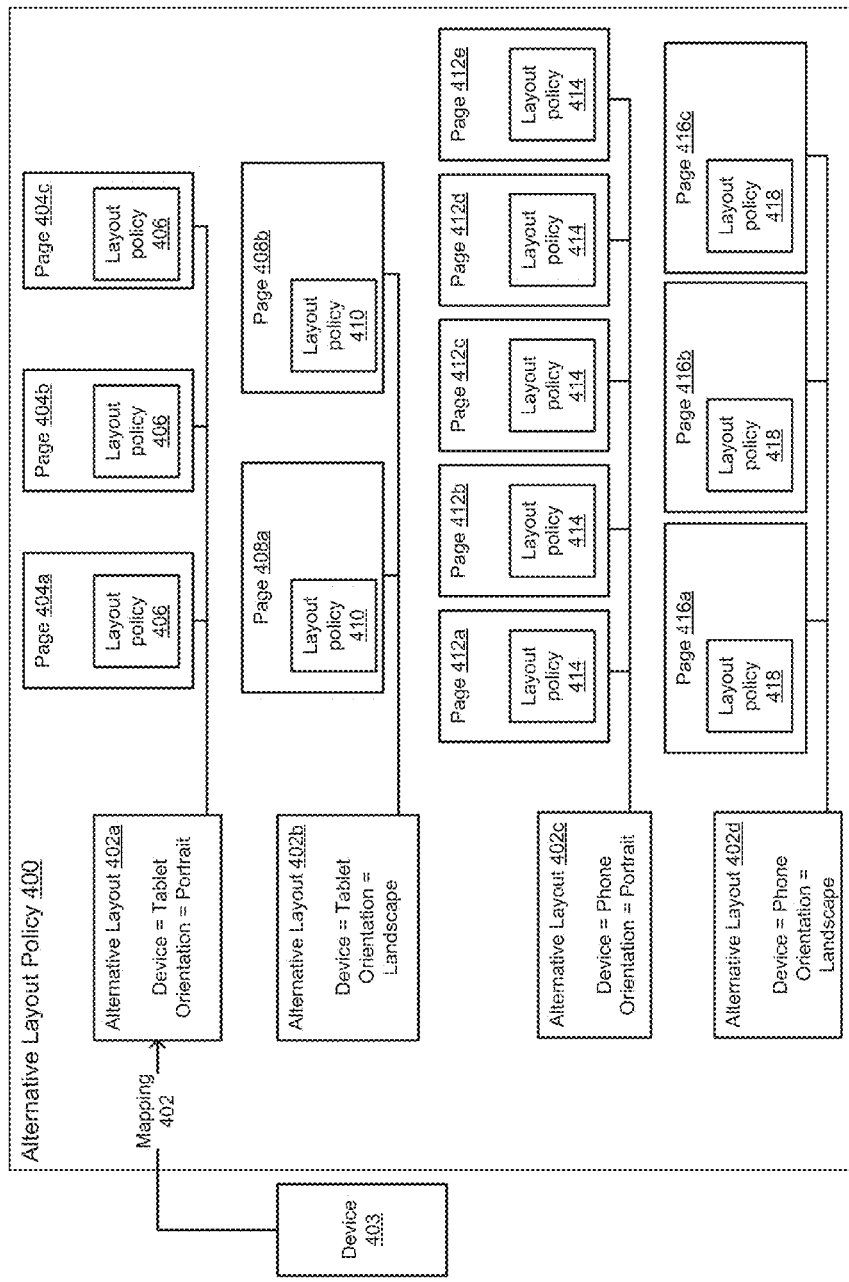
FIG. 4 is a conceptual diagram illustrating the application of an alternative layout policy to electronic content.

Multiple layout policies can be combined using an alternative layout policy. FIG. 4 is a conceptual diagram illustrating the application of an alternative layout policy 400 to electronic content. An alternative layout policy 400 can be used to adapt electronic content to be rendered at multiple computing devices with dramatic differences in display attributes. For example, a first layout of an alternative layout policy can be generated for a desktop computer and a second layout of the alternative layout policy can be generated for a smart phone.

An alternative layout policy 400 can include multiple alternative layouts 402a-d. The alternative layouts 402a-d can be associated with one another via the alternative layout policy 400. Each of the alternative layouts 402a-d can include a name and other metadata. The alternative layouts 402a-d can be specified based on the rendering attributes of a computing device, such as a display screen size, resolution, and/or orientation of the computing device. The alternative layouts 402a, 402b can be specified based on a tablet computer, such as the tablet computer 106. The alternative layouts 402c, 402d can be specified based on a smart phone, such as the smart phone 108. The alternative layouts 402a, 402c can be specified based on a computing device displaying content in a portrait orientation. The alternative layouts 402b, 402d can be specified based on a computing device displaying content in a landscape orientation.

Each of the alternative layouts 402a-d can be respectively associated with the layout policies 406, 410, 414, 418. Each of the layout policies 406, 410, 414, 418 can include one or more of a guide policy or an object policy. The layout policies 406, 410, 414, 418 can be used to adjust a layout for pages of electronic content to different display screen sizes corresponding to the orientation. For example, a layout policy 406 can be applied to the pages 404a-c to provide a portrait orientation having electronic content apportioned among three pages, each page having a title object across the top of the page. A layout policy 410 can be applied to the pages 408a, 408b to provide a landscape orientation having electronic content apportioned between two pages, each page having a title object positioned on the side. A layout policy 414 can be applied to the pages 412a-e to provide a portrait orientation having electronic content apportioned among five pages, each page having a title object omitted or reduced in size. A layout policy 418 can be applied to the pages 416a-c to provide a landscape orientation having electronic content apportioned among three pages, each page having a title object omitted or reduced in size.

An alternative layout policy 400 can include a mapping 402 from a device 403 having one or rendering attributes to a corresponding alternative layout. In one embodiment, a mapping 402 from device characteristics to one of the alternative layouts 402a-d can be performed automatically based on analyzing the page sizes for the alternative layouts 402a-d. One of the alternative layouts 402a-d most closely matching the computing device and the orientation of the computing device can be selected. In another embodiment, a mapping 402 from device characteristics to one of the alternative layouts 402a-d can be specified explicitly. For example, a mapping 402 can be specified based on a minimum and maximum display screen size, a minimum and maximum pixel size, and/or a computing device orientation. In another embodiment, a mapping 402 can be based on a display screen size and anticipated distance from an operator of the device to account for different devices such as smart phones, tablet computers, televisions, etc.

The mapping 402 can determine the one or more page layouts selected in response to selecting an alternative layout for a given computing device. In one embodiment, a viewer application can specify, based on input, which pages of the electronic content should appear and the order in which the pages should appear. In another embodiment, a viewer application can require the development environment 110 to arrange each alternative layout in its own section of the document.

In additional or alternative embodiments, each of the alternative layouts 402a-d can reference the same layout policy for certain objects. The alternative layout policy can link objects among different layouts by specifying one or more objects that are common to a page to be shared among different layouts. For example, a page including an advertisement object can be rendered for display in the same way for all layouts. Specifying one or more objects that are common to a page and to be shared among different layouts can allow for changing objects in a first layout and propagating the change to associated layouts for the alternative layout policy 400.

In additional or alternative embodiments, an alternative layout policy 400 can include associated multiple alternative layouts with a common document. The alternative layout policy 400 can include instructions specifying which layout to apply. For example, a first page of the document can be associated with two different layouts and a second page of the document can be associated with a single layout.

Figure 5:
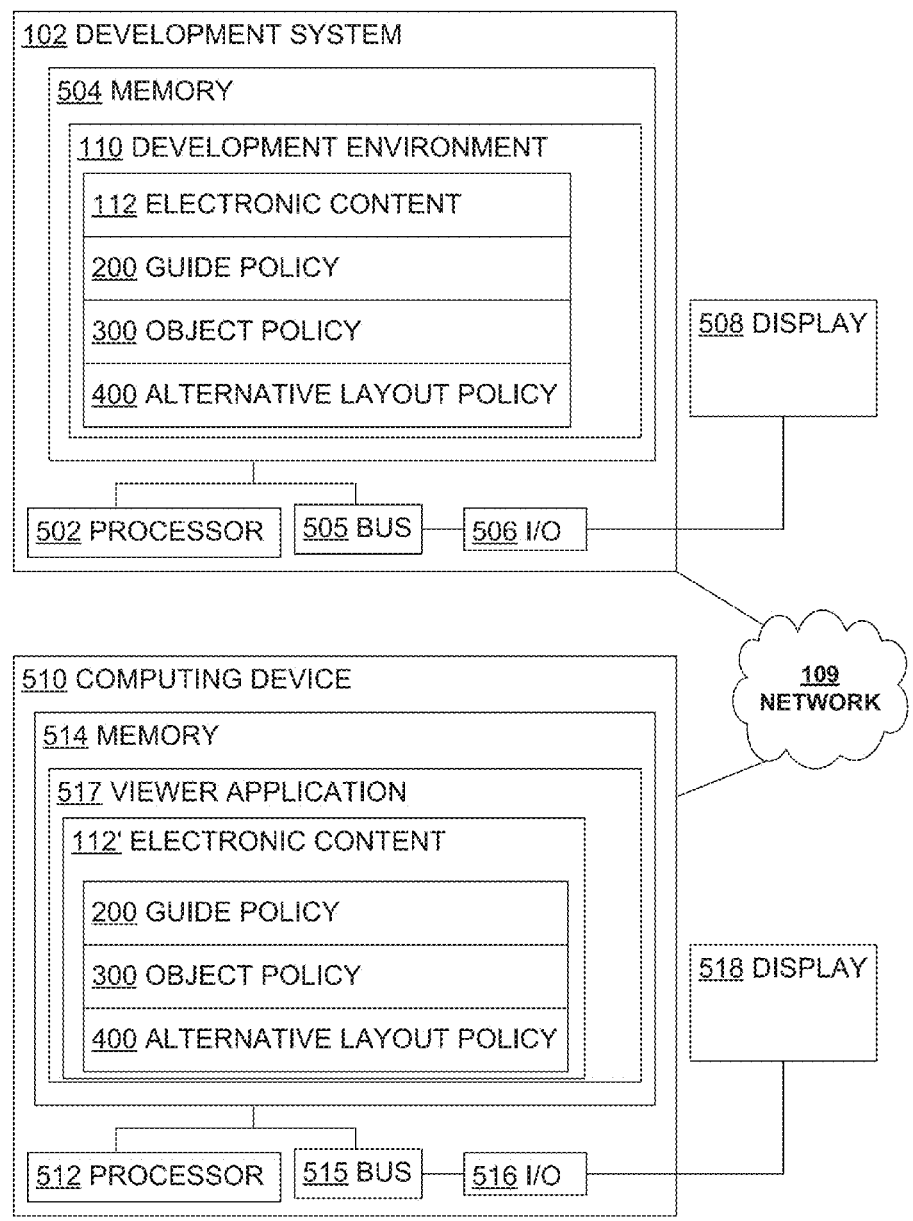
FIG. 5 is a block diagram depicting exemplary computing systems for implementing certain embodiments.

Any suitable development system 102 can be used to implement the embodiments described in FIGS. 2-4. FIG. 5 is a block diagram depicting exemplary computing systems for implementing certain embodiments. The exemplary computing systems include the development system 102 and a computing device 510. A computing device 510 can include, for example, a desktop computer 104, a tablet computer 106, a smart phone 108, or any other computing device suitable for rendering electronic content.

The development system 102 comprises a computer-readable medium such as a processor 502 communicatively coupled to a memory 504 that executes computer-executable program instructions and/or accesses information stored in the memory 504. The computing device 510 comprises a computer-readable medium such as a processor 512 communicatively coupled to a memory 514 that executes computer-executable program instructions and/or accesses information stored in the memory 514. Each of the processors 502, 512 may comprise a microprocessor, an ASIC, a state machine, or other processor, and can be any of a number of computer processors. Such a processor can comprise, or may be in communication with a computer-readable medium which stores instructions that, when executed by the processor, cause the processor to perform the steps described herein.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

Each of the development system 102 and the computing device 510 may also comprise a number of external or internal devices such as a mouse, a CD-ROM, DVD, a keyboard, a display, audio speakers, one or more microphones, or any other input or output devices. For example, the development system 102 is shown with an input/output ("I/O") interface 506 and a display device 508 and the computing device 510 is shown with an I/O interface 516 and a display device 518. A bus, such as buses 505, 515, can be respectively included in the development system 102 and the computing device 510.

FIG. 5 also illustrates the development environment 110 comprised in memory 504 of the development system 102 and the viewer application 517 comprised in the memory 514 of the computing device 510. The development environment 110 can include one or more software modules that provide an abstraction layer between the electronic content 112 being developed and the operating system-level operations (e.g., memory allocation or disk access) of the computing device accessing the electronic content 112. The viewer application 517 can include one or more software modules that can configure the processor 512 to render the electronic content 112' for display at the display device 518.

Electronic content 112, such as an application, executes or is otherwise used on the exemplary development system 102. As is known to one of skill in the art, such electronic content 112 may be resident in any suitable computer-readable medium and execute on any suitable processor. In one embodiment, electronic content 112 can reside in memory at the development system 102. In another embodiment, electronic content 112 can be accessed by the development system 102 from a remote location via the network 109.

A local copy of electronic content 112 such as electronic content 112' executes or is otherwise used on the exemplary computing device 510. The electronic content 112' can be encoded with one or more of the guide policy 200, the object policy 300, or the alternative layout policy 400. Likewise, the electronic content 112' can reside in the memory 514, as depicted in FIG. 5, or at a remote location.

Figure 6:
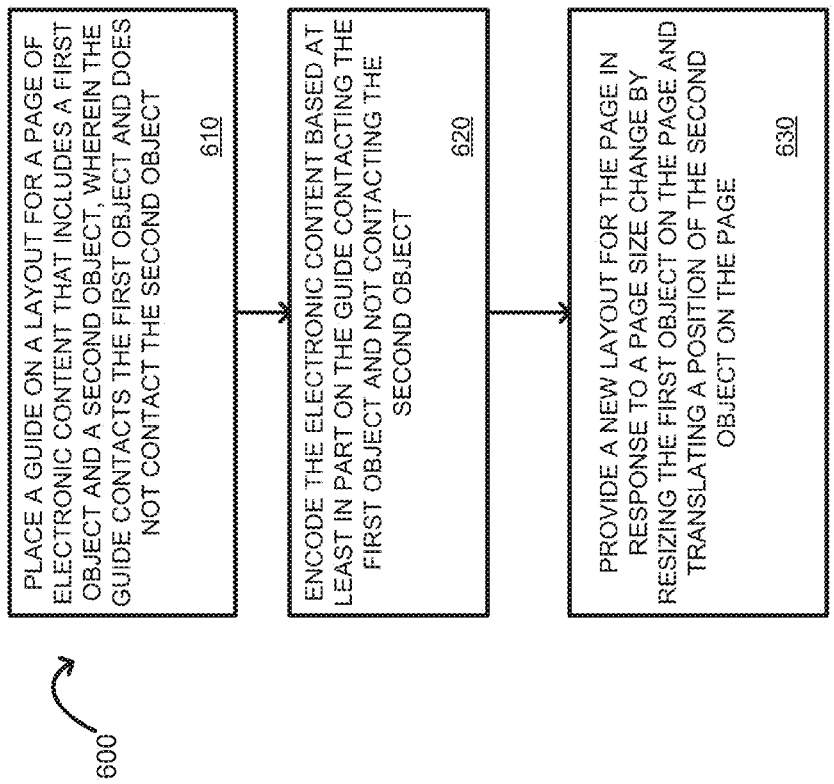
FIG. 6 is a flow chart illustrating an exemplary method for adapting a layout of electronic content using a guide policy.

FIG. 6 is a flow chart illustrating an exemplary method for adapting a layout of electronic content 112 using a guide policy 200. For illustrative purposes, the exemplary method 600 is described with reference to the concepts depicted in FIGS. 1-3 and the system implementations depicted in FIG. 5. Other implementations, however, are possible.

The exemplary method 600 involves placing a guide on a page, such as a page 120a of electronic content 112a, that includes a first object, as shown in block 610. The guide can contact the first object. A development application, such as the development environment 110, can be executed by the processor 502 to place the guide on the page 120a. The guide can be the horizontal guide 202 or the vertical guide 204. In additional or alternative embodiments, the page can include a second object that does not contact the guide.

The exemplary method 600 further involves encoding the electronic content 112a based at least in part on the guide contacting the first object, as shown in block 620. In additional or alternative embodiments, the electronic content 112 can also be encoded based on the guide not contacting the second object. The processor 502 can execute the development application to encode the electronic content 112a.

The exemplary method 600 further involves the encoded electronic content responding to a page size change by providing a new layout for the page, as shown in block 630. The processor 512 can execute the viewer application 517 to interpret or execute the encoded electronic content. The processor 512 can execute the viewer application 517 to modify the size of the page of the encoded electronic content. Modifying the size of the page can include modifying a height of the page. Modifying the size of the page can also include modifying a width of the page. In one embodiment, the width or height of the page can be modified in response to receiving, via the I/O interface 516, input triggering one or more of horizontal commands 206, 208, or vertical commands 210, 212, respectively. In another embodiment, the height or width of the page can be modified in response to receiving one or more of horizontal commands 206, 208 or vertical commands 210, 212, respectively, that are generated by the viewer application 517. The horizontal commands 206, 208 or vertical commands 210, 212 can be generated by the viewer application 517 detecting or receiving an input specifying a change in a display characteristic, such as a change in display screen size, resolution, orientation, etc.

The processor 512 can execute the viewer application to resize the first object. Resizing the first object can include modifying a width 209 or a height 214 of the first object based on the height 214 of the page as modified. In additional or alternative embodiments, resizing the first object can include dragging a left edge of the object in a direction indicated by a horizontal command 206, dragging a right edge of the object in a direction indicated by a horizontal command 208, dragging a top edge of the object in a direction indicated by a vertical command 210, or dragging a bottom edge of the object in a direction indicated by a vertical command 212.

In additional or alternative embodiments, the exemplary method 600 further involves translating a position of the second object based on the guide not contacting the second object, as shown in block 640. The processor 512 can execute the viewer application 517 to translate the position of the second object. In an exemplary embodiment, the second object can be translated in a direction indicated by an input. For example, an object 122a positioned between the vertical guide 204 and the top edge of the page can be vertically translated in response to a vertical command 210. An object 128a positioned between the horizontal guide 202 and the left edge of the page can be horizontally translated in response to a horizontal command 206. In additional or alternative embodiments, a third object not contacting a guide and positioned opposite the second object with respect to the guide can remain stationary in response to modifying the size of the page. For example, an object 124a can be positioned opposite objects 122a, 128a with respect to the horizontal guide 202 and can remain stationary in response to a horizontal command 206. An object 126 *a* can be positioned opposite an object 124a with respect to a vertical guide 204 and can remain stationary in response to a vertical command 212.

In additional or alternative embodiments, a page can include an additional object other than the first object contacting the guide. The additional object can be associated with an object policy 300 specifying at least one of a resizing behavior or a translation behavior for the additional object. The viewer application 517 executed by the processor 512 can resize the additional object based on the object policy 300 rather than based on the object contacting the guide. The resizing of the first object can thus differ from the resizing of the additional object.

Figure 7:
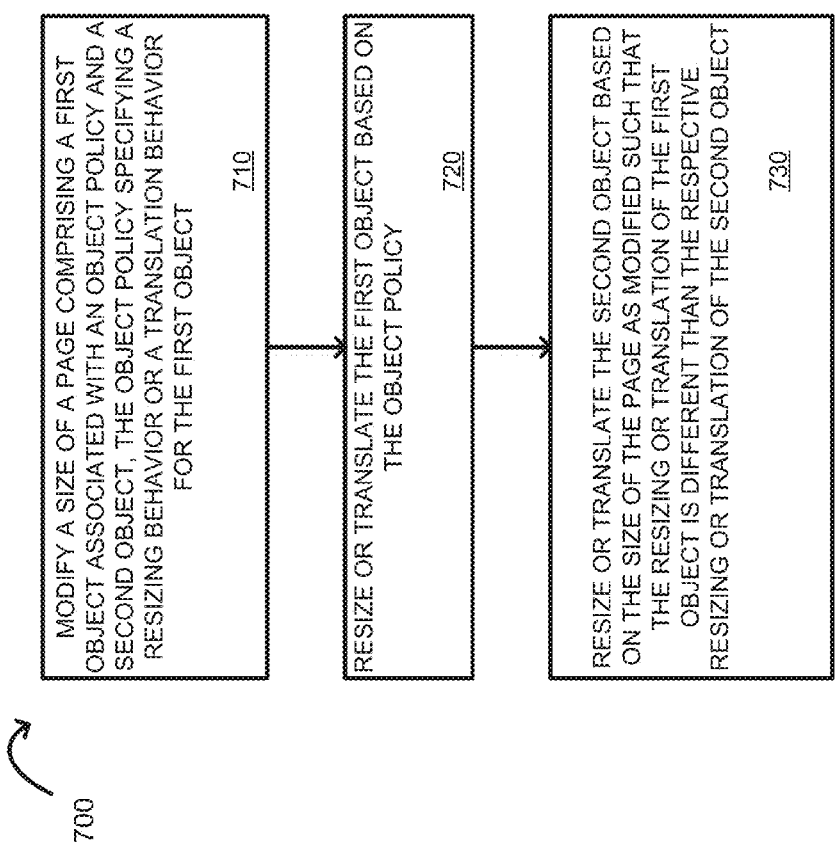
FIG. 7 is a flow chart illustrating an exemplary method for adapting a layout of electronic content using an object policy.

FIG. 7 is a flow chart illustrating an exemplary method for adapting a layout of electronic content 112 using an object policy 300. For illustrative purposes, the exemplary method 700 is described with reference to the concepts depicted in FIGS. 1 and 3 and the system implementation depicted in FIG. 5. Other implementations, however, are possible.

The exemplary method 700 involves modifying a size of a page of electronic content, wherein the page comprises a first object and a second object, as shown in block 710. A viewer application 517 can be executed by a processor 512 to modify the size of the page.

As discussed above with respect to method 600, modifying the size of the page can include modifying a width of the page via the horizontal commands 206, 208 or modifying a height of the page via the vertical commands 210, 212.

The first object can be associated with an object policy 300 specifying at least one of a resizing behavior or a translation behavior for the first object. For example, as described above with respect to FIG. 3, an object policy 300 can include horizontal adaptation parameters such as a left parameter 302, a right parameter 304, and a width parameter 306 and vertical adaptation parameters such as a top parameter 308, a bottom parameter 310, and a height parameter 312. The adaptation parameters can control the resizing or translation of the object in response to a modification to the size of the page.

The exemplary method 700 further involves resizing or translating the first object based on the object policy 300, as shown in block 720. The viewer application 517 can be executed by a processor 512 to resize or translate the first object. In one embodiment, a width parameter 306 or a height parameter 312 can have variable values such that the width or height of an object increases based on the respective width of height of the page. In another embodiment, a left parameter 302 can be fixed such that the left edge of an object is maintained at a fixed distance from a left edge of page and a width parameter 306 can be variable. A horizontal command 206 translating the left edge of the page can thereby translate the left edge of the object and modify the width of the object accordingly.

The exemplary method 700 further involves resizing or translating the second object based on the size of the page as modified, as shown in block 730. The viewer application 517 can be executed by a processor 512 to resize or translate the second object. The resizing or translating of the first object can be different from the respective resizing or translating of the second object. In an exemplary embodiment, both the first object and the second object can be in contact with a guide. The object policy 300 associated with the first object can specify that the size and position of the first object are not modified based on the guide. The second object can be unassociated with the guide. The first object can thus be resized or translated based on the object policy in a manner independent of the resizing or translating of the second object based on the guide.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method comprising:
   placing, by a development application executed by a processor, a guide on a layout for a page of electronic content, wherein the page comprises a first object and a second object, wherein the guide contacts the first object and does not contact the second object; and
   encoding, by the development application, the electronic content based at least in part on the guide contacting the first object and not contacting the second object,
   wherein the encoded electronic content, when interpreted or executed by a viewer application, responds to a page size change, the page size change being in an direction indicated by a received command, by providing a new layout for the page, the new layout for the page provided by resizing the first object on the page and translating a position of the second object on the page, wherein:
resizing the first object is based at least in part on whether an orientation of the guide contacting the first object is vertical or horizontal,
translating the position of the second object is based at least in part on the indicated direction of the page size change.

2. The method of claim 1, wherein the guide comprises at least one of a vertical line providing a horizontal guide or a horizontal line providing a vertical guide.

3. The method of claim 1, wherein the page size change comprises at least one of:
modifying a height of the page, wherein resizing the first object based on the guide contacting the first object comprises modifying a height of the first object based on the height of the page as modified; or
modifying a width of the page, wherein resizing the first object based on the guide contacting the first object comprises a width of the first object based on the width of the page as modified.

4. The method of claim 3,
wherein modifying the width of the page comprises modifying the width of the page in response to a horizontal command indicating a horizontal direction and wherein translating the second object comprises modifying the position of the second object in the horizontal direction; and
wherein modifying the height of the page comprises modifying the height of the page in response to a vertical command indicating a vertical direction and wherein translating the second object comprises modifying the position of the second object in the vertical direction.

5. The method of claim 1, wherein the page further comprises an additional object not contacting the guide and positioned opposite the second object with respect to the guide, wherein the additional object remains stationary in response to modifying the size of the page.

6. The method of claim 1, further comprising rendering for display, by the viewer application, the electronic content based on the new layout by:
modifying the size of the page;
resizing the first object based on the guide contacting the first object by modifying the size of the first object based on the size of the page as modified; and
translating the position of the second object based on the guide being adjacent to the second object.

7. The method of claim 6,
wherein the page further comprises an additional object contacting the guide and associated with an object policy, the object policy specifying at least one of resizing behavior or translation behavior for the additional object, and
further comprising resizing, by the viewer application, the additional object based on the object policy, wherein the resizing of the first object is different from the resizing of the additional object.

8. The method of claim 7, wherein the object policy comprises:
one or more horizontal parameters controlling at least one of a horizontal resizing behavior or a horizontal translation behavior, and
one or more vertical parameters controlling at least one of a vertical resizing behavior or a vertical translation behavior.

9. The method of claim 8, further comprising:
generating, by the development application, a first alternative layout comprising a first layout, the guide, and the object policy, wherein the first layout specifies a first arrangement of the first object, the second object and the additional object;
generating, by the development application, a second alternative layout comprising a second layout, the guide, and the object policy, wherein the second layout specifies a second arrangement of the second object, the second object and the additional object; and
generating, by the development application, an alternate layout policy comprising the first alternative layout, the second alternative layout, and an association among the first alternative layout, the second alternative layout, and a document.

10. The method of claim 1, wherein the guide is a vertical guide and contact between the vertical guide and the first object causes a height of the first object to be modified.

11. The method of claim 1, wherein the guide is a horizontal guide and contact between the horizontal guide and the first object causes a width of the first object to be modified.

12. The method of claim 1, wherein the page further comprises an additional object, wherein the guide does not contact the additional object;
wherein the electronic content is encoded based at least in part on the guide not contacting the additional object;
wherein providing the new layout for the page comprises:
resizing the first object in a direction that is selected based at least in part on the orientation of the guide with respect to the page, and
maintaining the size of the additional object on the page based at least in part on the guide not contacting the second object.

13. The method of claim 1, wherein:
the page comprises a third object, wherein the guide does not contact the third object;
the second object has a first position with respect to the guide;
the third object has a second position with respect to the guide, wherein the first position and the second position are opposite with respect to the guide;
the indicated direction is on a same side of the page with respect to the second object, and is on an opposite side of the page with respect to the third object; and
the second position of the third object is unchanged in response to the page size change.

14. A non-transitory computer-readable medium embodying program code executable by a computer system, the non-transitory computer-readable medium comprising:
program code for placing a guide on a layout for a page of electronic content, wherein the page comprises a first object and a second object, wherein the guide contacts the first object and does not contact the second object; and
program code for encoding the electronic content based at least in part on the guide contacting the first object and not contacting the second object,
wherein the encoded electronic content, when interpreted or executed by a viewer application, responds to a page size change by providing a new layout for the page, the page size change being in a direction indicated by a received command, the new layout for the page provided by resizing the first object on the page and translating a position of the second object on the page, wherein:

resizing the first object is based at least in part on whether an orientation of the guide contacting the first object is vertical or horizontal; and translating the position of the second object is based at least in part on the indicated direction of the page size change.

15. The non-transitory computer-readable medium of claim 14, wherein the program code for responding to the page size change comprises program code for performing at least one of:

modifying a height of the page, wherein resizing the first object based on the guide contacting the first object comprises a height of the first object based on the height of the page as modified; or modifying a width of the page, wherein resizing the first object based on the guide contacting the first object comprises a width of the first object based on the width of the page as modified.

16. The non-transitory computer-readable medium of claim 15, wherein modifying the width of the page comprises modifying the width of the page in response to a horizontal command indicating a horizontal direction and wherein translating the second object comprises modifying the position of the second object in the horizontal direction; and wherein modifying the height of the page comprises modifying the height of the page in response to a vertical command indicating a vertical direction and wherein translating the second object comprises modifying the position of the second object in the horizontal direction.

17. The non-transitory computer-readable medium of claim 14, wherein the page further comprises an additional object not contacting the guide and positioned opposite the second object with respect to the guide, wherein the additional object remains stationary in response to modifying the size of the page.

18. The non-transitory computer-readable medium of claim 17, wherein the page further comprises an additional object contacting the guide and associated with an object policy, the object policy specifying at least one of resizing behavior or translation behavior for the additional object;

wherein resizing the first object comprises modifying a size of the first object based on the size of the page as modified; and further comprising resizing the additional object based on the object policy, wherein the resizing of the first object is different than the resizing of the additional object.

19. The non-transitory computer-readable medium of claim 18, further comprising:

program code for generating a first alternative layout comprising a first layout, the guide, and the object policy, wherein the first layout specifies a first arrangement of the object, the second object and the additional object;

program code for generating a second alternative layout comprising a second layout, the guide, and the object policy, wherein the second layout specifies a second arrangement of the second object, the second object and the additional object; and program code for generating an alternate layout policy comprising the first alternative layout, the second alternative layout, and an association among the first alternative layout, the second alternative layout, and a document.

20. A system comprising:

a non-transitory computer-readable medium configured to store instructions providing a development application and a guide policy;

a processor configured to execute the instructions stored in the non-transitory computer-readable medium to apply the guide policy by performing operations comprising:

placing a guide on a layout for a page of electronic content, wherein the page comprises a first object and a second object, wherein the guide contacts the first object and does not contact the second object; and encoding the electronic content based at least in part on the guide contacting the first object and not contacting the second object, wherein the encoded electronic content, when interpreted or executed by a viewer application, responds to a page size change by providing a new layout for the page, the page size change being in a direction indicated by a received command, and the new layout for the page provided by resizing a size of the first object on the page and translating a position of the second object on the page, wherein:

resizing the first object is based at least in part on whether an orientation of the guide contacting the first object is vertical or horizontal; and translating the position of the second object is based at least in part on the indicated direction of the page size change.

21. The system of claim 20, wherein the processor is configured to respond to the page size change by performing operations comprising at least one of:

modifying a height of the page, wherein resizing the first object based on the guide contacting the first object comprises a height of the first object based on the height of the page as modified; or modifying a width of the page, wherein resizing the first object based on the guide contacting the first object comprises a width of the first object based on the width of the page as modified.

22. The system of claim 21, wherein modifying the width of the page comprises modifying the width of the page in response to a horizontal command indicating a horizontal direction and wherein translating the second object comprises modifying the position of the second object in the horizontal direction; and wherein modifying the height of the page comprises modifying the height of the page in response to a vertical command indicating a vertical direction and wherein translating the second object comprises modifying the position of the second object in the horizontal direction.

23. The system of claim 20, wherein the non-transitory computer-readable medium is further configured to store additional instructions providing an object policy and wherein the processor is further configured to execute the additional instructions to apply the object policy by performing additional operations comprising:

associating the object policy with an additional object on the page contacting the guide, wherein the object policy specifies at least one of a resizing behavior or a translation behavior for the additional object;

resizing the first object by modifying a size of the first object based on the size of the page as modified; and
resizing the additional object based on the object policy, wherein the resizing of the first object is different than the resizing of the additional object.

\* \* \* \* \*